(12) United States Patent
Reese et al.

(10) Patent No.: US 9,746,842 B2
(45) Date of Patent: Aug. 29, 2017

(54) CAN BUS COMMERCIAL APPLIANCE SYSTEM AND METHOD

(71) Applicant: Duke Manufacturing Co., St. Louis, MO (US)

(72) Inventors: Robert J. Reese, Edwardsville, IL (US); Jeffrey A. Stafford, Godfrey, IL (US); David Robert Jones, St. Charles, MO (US); Philip Gregory Geerling, St. Louis, MO (US)

(73) Assignee: Duke Manufacturing Co., St. Louis, MO (US)

( * ) Notice: Subject to any disclaimer, the term of this patent is extended or adjusted under 35 U.S.C. 154(b) by 921 days.

(21) Appl. No.: 13/874,939

(22) Filed: May 1, 2013

(65) Prior Publication Data

US 2013/0297042 A1 Nov. 7, 2013

Related U.S. Application Data

(60) Provisional application No. 61/640,875, filed on May 1, 2012.

(51) Int. Cl.
*G05B 19/02* (2006.01)
*G05B 19/042* (2006.01)
*H04L 12/40* (2006.01)

(52) U.S. Cl.
CPC ........... *G05B 19/02* (2013.01); *G05B 19/042* (2013.01); *G05B 19/0421* (2013.01); *G05B 19/0426* (2013.01); *H04L 12/40202* (2013.01); *G05B 2219/25032* (2013.01); *G05B 2219/2613* (2013.01); *H04L 2012/40215* (2013.01)

(58) Field of Classification Search
CPC ............... G05B 19/02; G05B 2219/25032
USPC .................. 700/3, 15, 17, 19, 40, 83
See application file for complete search history.

(56) References Cited

U.S. PATENT DOCUMENTS

| | | | |
|---|---|---|---|
| 6,332,327 B1 | 12/2001 | Street et al. |
| 6,535,786 B1 | 3/2003 | Deumler |
| 6,549,866 B1 | 4/2003 | Bhatnagar |
| 6,615,088 B1 | 9/2003 | Myer et al. |
| 6,845,627 B1 | 1/2005 | Buck |
| 7,131,549 B2 | 11/2006 | Hook |
| 7,232,062 B1 | 6/2007 | Salerno |
| 7,259,953 B2 | 8/2007 | Salerno |
| 7,661,459 B2 | 2/2010 | Wesley et al. |
| 7,848,845 B2 | 12/2010 | Salerno |

(Continued)

FOREIGN PATENT DOCUMENTS

| CN | 201405808 Y | 2/2010 |
|---|---|---|
| DE | 10018136 A1 | 10/2001 |

(Continued)

OTHER PUBLICATIONS

International Search Report dated Oct. 31, 2013 relating to PCT Patent Application No. PCT/US2013/038988, 2 pages.

(Continued)

*Primary Examiner* — Christopher E Everett
(74) *Attorney, Agent, or Firm* — Senniger Powers LLP

(57) ABSTRACT

One or more commercial appliances for handling food and/or one of more subsystems of commercial appliances for handling food are linked to a master controller for controlling the operation of the commercial appliance(s) and/or its subsystem(s) via one or more CAN modules and a CAN bus.

24 Claims, 7 Drawing Sheets

(56) References Cited

U.S. PATENT DOCUMENTS

| | | | |
|---|---|---|---|
| 7,877,291 B2 | 1/2011 | Koether et al. | |
| 2002/0082924 A1 | 6/2002 | Koether | |
| 2006/0249033 A1 | 11/2006 | Engelhardt et al. | |
| 2009/0114636 A1 | 5/2009 | Veltrop et al. | |
| 2010/0071384 A1 | 3/2010 | Lu et al. | |
| 2010/0115252 A1* | 5/2010 | Campbell | G06F 11/1415 713/1 |

FOREIGN PATENT DOCUMENTS

| | | |
|---|---|---|
| DE | 20203117 U1 | 5/2002 |
| EP | 1 044 400 B1 | 4/2006 |
| EP | 1 758 056 A2 | 2/2007 |
| EP | 2 320 605 A1 | 5/2011 |
| WO | 02/054163 A1 | 7/2002 |
| WO | 02054163 A1 | 7/2002 |
| WO | 2006/135758 A1 | 12/2006 |
| WO | 2006135758 A1 | 12/2006 |
| WO | 2010/031012 A1 | 3/2010 |

OTHER PUBLICATIONS

European Search Report dated Dec. 16, 2015 relating to European Application No. 13784783.6, 9 pages.
Examination Report dated Aug. 2, 2016 in Australian Application No. 2013256376, 3 pages.
Search Report dated Dec. 16, 2015 in European Application No. 13784783.6, 9 pages.
Office Action dated Feb. 13, 2017 in Chinese Application No. 201380023011.5, 16 pages.

* cited by examiner

CAN BUS COMMERCIAL APPLIANCE SYSTEM AND METHOD

BACKGROUND

The present invention generally relates to controls for commercial appliances and, in particular, a CAN bus system and method for linking and controlling a plurality of commercial appliances to a master controller or for linking and controlling a plurality of subsystems of one or more commercial appliances.

SUMMARY

In one form, the invention is a system for use with or including a first commercial appliance for handling food and a second commercial appliance for handling food. A master controller controls the operation of the first and second commercial appliances. CAN modules control the appliances and a CAN bus links the modules and the master controller.

In one embodiment, a first CAN module has a plurality of ports connected to the first commercial appliance for controlling and monitoring the operation of the first commercial appliance. The first CAN module has a first mode of operation responsive to the master controller for controlling the first commercial appliance and has a second mode of operation independent of the master controller for controlling the first commercial appliance. A second CAN module has a plurality of ports connected to the second commercial appliance for controlling and monitoring the operation of the second commercial appliance. The second CAN module has a first mode of operation responsive to the master controller for controlling the second commercial appliance and has a second mode of operation independent of the master controller for controlling the second commercial appliance.

In one embodiment, the master controller sends first CAN control signals to the first CAN module via the CAN bus to control the first commercial appliance and sends second CAN control signals to the second CAN module via the CAN bus to control the second commercial appliance. The first CAN module operates in its first mode to control the first commercial appliance in response to the first CAN control signals from the master controller when the master controller is in communication with the first CAN module via the CAN bus. The first CAN module operates in its second mode to control the first commercial appliance independent of the master controller when the master controller is not in communication with the first CAN module via the CAN bus. Similarly, the second CAN module operates in its first mode to control the second commercial appliance in response to the second CAN control signals from the master controller when the master controller is in communication with the second CAN module via the CAN bus. The second CAN module operates in its second mode to control the second commercial appliance independent of the master controller when the master controller is not in communication with the second CAN module via the CAN bus.

In one form, the invention is a system for use with or including a first subsystem of a commercial appliance for handling food and a second subsystem of the commercial appliance for handling food. A master controller controls the operation of the first and second subsystems. CAN modules control the subsystems and a CAN bus links the modules and the master controller.

In one form, the invention includes a method for use with a first commercial appliance for handling food and a second commercial appliance for handling food. The method comprises:

providing a master controller for controlling the operation of the first and second commercial appliances;

providing a first CAN module having a plurality of ports connected to the first commercial appliance for controlling and monitoring the operation of the first commercial appliance, said first CAN module having a first mode of operation responsive to the master controller for controlling the first commercial appliance and having a second mode of operation independent of the master controller for controlling the first commercial appliance;

providing a second CAN module having a plurality of ports connected to the second commercial appliance for controlling and monitoring the operation of the second commercial appliance, said second CAN module having a first mode of operation responsive to the master controller for controlling the second commercial appliance and having a second mode of operation independent of the master controller for controlling the second commercial appliance;

providing a CAN bus for interconnecting the master controller, the first CAN module and the second CAN module;

sending by said master controller first CAN control signals to the first CAN module via the CAN bus to control the first commercial appliance;

sending by said master controller second CAN control signals to the second CAN module via the CAN bus to control the second commercial appliance;

operating said first CAN module in its first mode to control the first commercial appliance in response to the first CAN control signals from the master controller when the master controller is in communication with the first CAN module via the CAN bus;

operating said first CAN module in its second mode to control the first commercial appliance independent of the master controller when the master controller is not in communication with the first CAN module via the CAN bus;

operating said second CAN module in its first mode to control the second commercial appliance in response to the second CAN control signals from the master controller when the master controller is in communication with the second CAN module via the CAN bus; and operating said second CAN module in its second mode to control the second commercial appliance independent of the master controller when the master controller is not in communication with the second CAN module via the CAN bus.

In one embodiment, the invention comprises a master controller comprising a processor, a touch screen responsive to user input for adjusting parameters for controlling the first and second commercial appliances and a storage device storing instructions executed by the processor including instructions for:

sending first CAN control signals to a first CAN module via a CAN bus to control a first commercial appliance;

sending second CAN control signals to a second CAN module via the CAN bus to control a second commercial appliance;

operating the first CAN module in its first mode to control the first commercial appliance in response to the first CAN control signals from the master controller when the master controller is in communication with the first CAN module via the CAN bus;

operating the second CAN module in its first mode to control the second commercial appliance in response to the second CAN control signals from the master controller when the master controller is in communication with the second CAN module via the CAN bus;

wherein the first CAN module operates in its second mode to control the first commercial appliance independent of the master controller when the master controller is not in communication with the first CAN module via the CAN bus; and wherein the second CAN module operates in its second mode to control the second commercial appliance independent of the master controller when the master controller is not in communication with the second CAN module via the CAN bus.

In one form, the invention is a system for use with or including a first commercial appliance for handling food. A master controller controls the operation of the first commercial appliance. A CAN module controls the appliance and a CAN bus links the module and the master controller.

In another form, the invention is a system for use with or including a first subsystem of a commercial appliance for handling food. A master controller controls the operation of the first subsystem. A CAN module controls the subsystem and a CAN bus links the module and the master controller.

Other objects and features will be in part apparent and in part pointed out hereinafter.

BRIEF DESCRIPTION OF THE DRAWINGS AND APPENDICES

Figure 1:
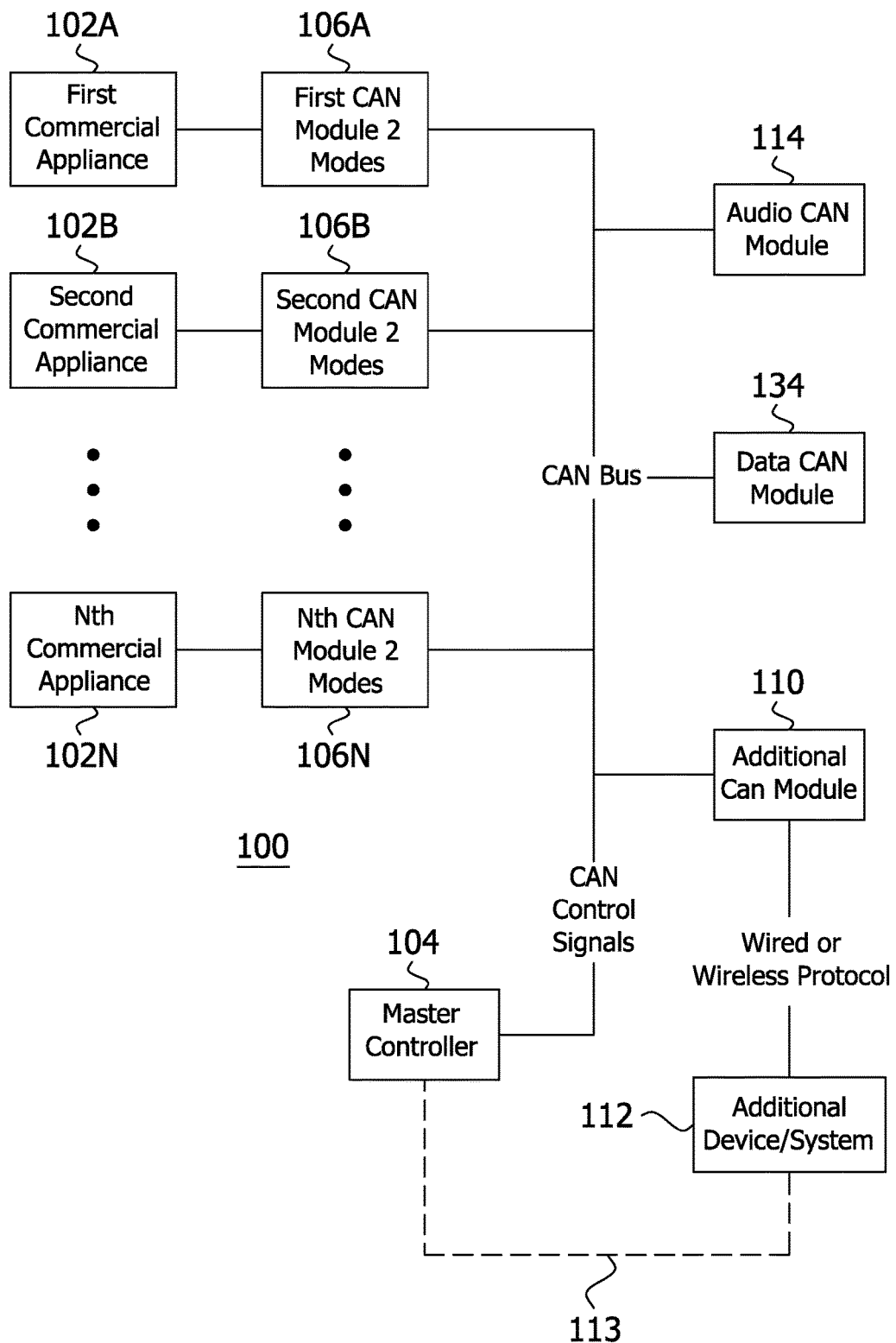
FIG. 1 is a block diagram of a system of one embodiment of the invention including commercial appliances for heating (e.g., cooking, warming) or cooling (e.g., refrigerating, freezing), CAN modules, a CAN bus and a master controller.

Appendix 1 includes four screen shots illustrating the start screens of one embodiment of a master controller.

Appendix 2 includes four oven screen shots illustrating the screens controlling the oven of one embodiment of a master controller.

Appendix 3 includes seven proofer screen shots illustrating the screens controlling the proofer of one embodiment of a master controller.

Appendix 4 describes an implementation of one embodiment of a system of the invention.

Corresponding reference characters indicate corresponding parts throughout the drawings.

DETAILED DESCRIPTION

Figure 2:
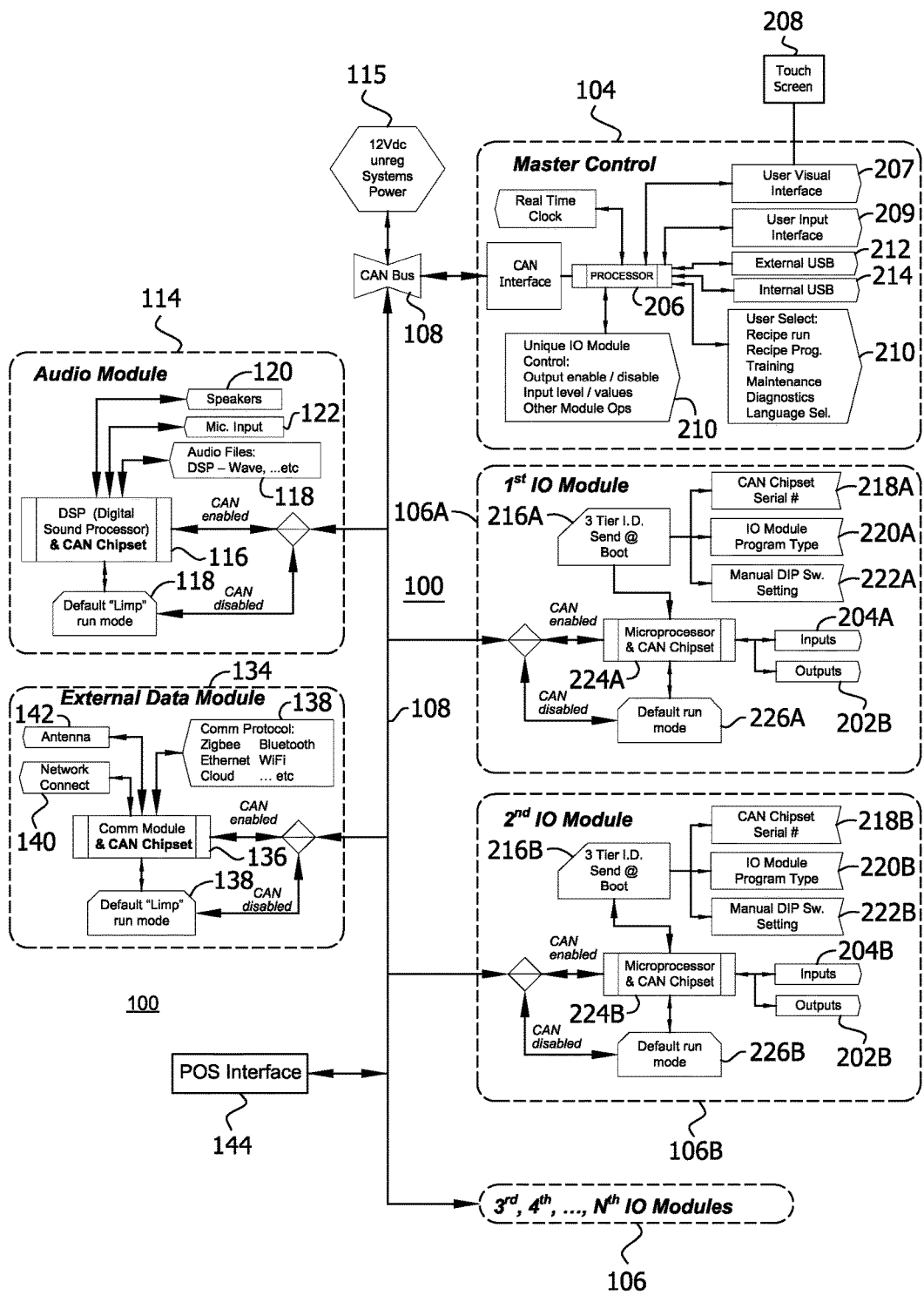
FIG. 2 is a detailed block diagram of a system and system components of one embodiment of the invention.

Referring to FIGS. 1 and 2, a system 100 of one embodiment of the invention includes commercial appliances for handling food including commercial appliances for cooking (e.g., proofer, oven) and/or cooling (refrigerator, freezer) and/or holding (display, merchandizer or food storage), in combination with CAN modules, a CAN bus and a master controller. FIG. 1 illustrates the system in block diagram form and FIG. 2 illustrates the system and its components in a detailed block diagram form. The system 100 includes at least two commercial appliances 102 for cooking or preserving food, such as proofers, ovens, refrigerators and/or freezers. A master controller 104 controls the operation of the commercial appliances 102 via CAN modules 106, one connected each appliance, networked to the master controller 104 by a CAN bus 108, for interconnecting the master controller 104 and the CAN modules 106.

Each CAN module 106 is an I/O module having input ports and output ports (herein "inputs" and "outputs") which may be analog or digital inputs and analog or digital outputs. In the embodiment illustrated, the CAN module 106 includes a plurality of analog outputs 202, each connected to its associated commercial appliance 102 for controlling the operation of its associated commercial appliance 102. In addition, each CAN module 106 has a plurality of CAN inputs 204 connected to its associated appliance or connected to sensors, for monitoring its associated appliance 102.

Each CAN module 106 is configured to have a first mode of operation responsive to the master controller 104 for controlling its associated commercial appliance. In addition, each CAN module 106 is configured to have a second mode of operation independent of control of the master controller 104 for controlling its associated commercial appliance. The first mode is responsive to the user and user input to the master controller 104 which allows the master controller 104 to communicate via the CAN bus 108 with the CAN module 106 in the first mode to control its associated appliance 102 in response to the user input. The second mode is sometimes referred to as a default or limp mode. It one form, the CAN module 106 operates in the second mode when there is insufficient communication with the master controller 104 such as when the master controller 104 is not powered or not operating or when the CAN bus 108 is down.

In the first mode, the master controller 104 sends first CAN control signals to the first CAN module 106A via the CAN bus 108 to control the first commercial appliance 102A. Similarly, the master controller the master controller 104 sends second CAN control signals to the second CAN module 106B via the CAN bus 108 to control the second commercial appliance 102B.

In the first mode, each CAN module 106 operates to control its associated commercial appliance 102 in response to its CAN control signals from the master controller 104 when the master controller is in communication with the CAN module 106 via the CAN bus. In the second mode, each CAN module 106 operates to control its associated commercial appliance 102 independent of the master controller 104 when the master controller is not in communication with the CAN module 106 via the CAN bus 108.

The system includes an unregulated 12 Vdc power supply 115 for supplying power to each of the modules.

Master Controller:

Referring to FIG. 2, the master controller 104 comprises a processor 206, a touch screen 208 connected to the processor via a user visual interface 207 and responsive to user input for adjusting parameters for controlling the commercial appliances 102 and a storage device 210 storing instructions executed by the processor 206 including instructions for controlling the operation of the master controller 104, instructions for controlling a graphical user interface (GUI; see screen shots) displayed on the touch screen 208, and instructions for controlling the commercial appliances 102. As noted herein, the instructions for controlling the first commercial appliance 102A are different than the instructions for controlling the second commercial appliance 102B. For example, the first commercial appliance 102A may be a proofer and the second commercial appliance 102B may be an oven, each of which requires different control and operates according to different recipes. In one embodiment, each CAN module 106 has a unique identification which is communicated to the master controller 104 so that the master controller 104 is able to identify the appliance 102 connected to each of the CAN modules 106 and so that the master controller 104 is able to control each appliance 102 according to its type and function. Optionally, the processor 206 may have a user input interface 209 for receiving user input via a keypad or other input device.

As noted above, one form of the invention is a system 100 for use with or including at least a first commercial appliance 102A for handling food and a second commercial appliance 102B for handling food. A master controller 104 controls the operation of the first and second commercial appliances 102A, 102B. CAN modules 106A, 106B control the appliances and a CAN bus 108 links the modules 106A, 106B and the master controller 104. In another form, the invention is a system 100 for use with or including a first subsystem 102A of a commercial appliance for handling food and a second subsystem 102B of the commercial appliance for handling food. For example, the first subsystem 102A may be heating system of the commercial appliance (e.g., a proofer oven) and the second subsystem may be a humidifier or convection fan or other subsystem of the proofer oven. The master controller 104 controls the operation of the first and second subsystems 102A, 102B. CAN modules 106A, 106B control the subsystems 102A, 102B and a CAN bus 108 links the modules 106A, 106B and the master controller 104. The remaining description will relate to systems including at least two commercial appliances. However, it should be understood to those skilled in the art that the remaining description also applies to systems including at least one subsystem of a commercial appliance and/or systems including at least one subsystem of a first commercial appliance and a second commercial appliance.

In place of or in addition to the touch screen 208, other user input devices may be used. For example, a graphic overlay with embedded switches, discrete mechanical push button switches, a non-touch display, a basic 2-color display, and/or indicator lights may be used.

In one embodiment, the storage device 210 optionally stores one or more of the following: recipe running instructions to execute recipes, recipe programming instructions to permit an user to change or add a recipe, training instructions for training an user, maintenance and diagnostic instructions for indicating to the user maintenance or diagnostics, and a plurality of user-selectable languages which are displayed as part of the GUI presented on the touch screen 208. Optionally, the master controller comprises an internal USB port 212 for connecting to an internal memory for storing data indicative of the operation and/or use of the commercial appliances and an external USB port 214 for connecting to an external memory for updating instructions in the storage device 210 which are executed by the processor 206. Optionally, the external USB port 214 may collect and store data indicative of the operation and/or use of the commercial appliances.

In one embodiment, the storage device 210 of the master controller 104 stores instructions for uniquely identifying each CAN module 106. For the identity of each module that is identified, the master controller 104 determines a configuration of commercial appliance associated with the identified module. The storage device 210 of the master controller 104 stores a plurality of instructions for controlling various appliances and various configurations. The processor 206 executes one of the plurality of instructions for controlling each commercial appliance based on the identity of each identified CAN module. The identity of each CAN module 106 is indicative of the configuration of its associated commercial appliance, so that the processor executes instructions for controlling the commercial appliance based on the identity of the CAN module.

Storage device 210 for the master controller 104 includes processor executable instruction regarding user interaction. For example, a user may provide a touch input for: directing recipe operation, programming of recipe times and set points, viewing training guides/instructions, accessing controller identified maintenance tasks such as "time to change the water filter", and a user language selection/translation of screens (English, French, German, etc.).

CAN I/O Module:

In one embodiment, each CAN module 106 includes a unique serial number communicated to the master controller 104 via the CAN bus 108. Each CAN module 106 has a firmware configuration corresponding to the commercial appliance associated with the CAN module 106 and each CAN module communicates to the master controller 104 its unique serial number and its associated commercial appliance configuration. The master controller 104 responds to this communication to provide information and instructions to the CAN module 106 to direct the module to control its associated commercial appliance 102.

For example, each CAN module 106 may have a microprocessor with a storage device and a CAN chipset (e.g., Analog Devices #ADM3053BRWZ) connected between the microprocessor and the CAN bus 108. The microprocessor/chipset 224 includes ID instructions 216 stored in the microprocessor storage device which are executed whenever the CAN module 106 is initially powered up to transmit identification information via the CAN bus to the master controller 104. In one embodiment, each CAN module has a three tier identification such that each CAN module has a unique set of identification indicators. First, each CAN includes a CAN chipset serial number 218 which is unique to each CAN chipset and embedded in each CAN chipset. Second, the instructions 216 include an I/O module program type 220 which identifies the commercial appliance 102 associated with the CAN module 106. For example, the program type may be an oven. Since several of the same commercial appliances (e.g., several ovens) may be connected to the CAN bus, each CAN module has a third tier ID in the form of manual dip switches 222 which are set by an installer. When connected two or more CAN modules associated with the same time of appliance, the installer sets the dip switches as different locations so that each CAN module has a unique dip switch configuration. This allows the master controller 104 to distinguish between two CAN modules associated with the same type of commercial appliance.

For example, the unique identification of each CAN module may include a first "type ID," such as 0x0B01 indicating an IO board (type B), version 1 or config 1. This is not necessarily a firmware indicator. The indicator tells the controller the board type/function. A second part of the ID is a unique identifier stored in a special MAC address EEPROM chip. The third part is a set of DIP switches indicating the pre-determined order of IO boards in the sequence. For instance, for a given machine the IO board 1 (DIP=1) is wired with input 1 as a door switch and so on. Board 2 is wired in an X configuration. The DIP switch settings actually indicate the CAN COB ID node assigned to that board. Board 1 will use identifiers 0x211 for status1, 0x231 for cmd1. The next board will use 0x212, 0x232 and so on. There are many ways to expand this, such as by using TSC2 code and a CANlib Software Development Kit, or other transparent application programming interface for interfacing to various hardware platforms.

In one embodiment as shown in FIG. 1, an additional CAN module 110, such as a module configured to communicate via a protocol (wired or wireless), may be used to communicate with an additional device or system 112 and the master controller 104 controls the additional device or system 112 via the CAN module 110. Alternatively or in addition, the additional CAN module 110 may be used to communicate with the additional device or system 112 so that the master controller 104 and/or the other modules connected to the CAN bus 108 are responsive to the additional device or system 112. Other single or multiple configurations of the module 112 for other communication protocols include WiFi, BlueTooth, a hardwired/direct connection such as USB, 485, 232, and/or a modular bus. The additional device or system 112 may be one or more of the following: a network host, a computer or a point-of-sale device or system. In general, the additional device or system 112 includes any apparatus that interfaces directly or indirectly with the system 100 during set-up, calibration or operation of the system 100. It is also contemplated that the additional device or system 112 may be connected to the master controller 104 via a wired or wireless link 113 shown in phantom to facilitate communication directly with the master controller 104. This link may be in addition to or instead of the additional CAN module 110 which interfaces between the CAN bus 108 and the additional device or system 112.

In one embodiment, the microprocessor/chipset 224 includes default run mode instructions 226 stored in the microprocessor storage device which are executed whenever the CAN module 106 to operate in the second mode when the CAN module 106 not in communication with the CAN bus 108, not in communication with the master controller 104 and/or the bus or master controller are not operating properly. For example, each CAN module 106 in the second mode of operation controls its associated commercial appliance 102 to maintain a preset temperature of the appliance, to maintain a preset humidity of the appliance, and/or to provide an indicator that the CAN module 102 is operating in the second mode. An indicator may be blinking a light of the appliance 102 or activating an audible or visual signal (e.g., blinking a light of the appliance 102 once or twice every 60 seconds).

An optional audio module 114 may be connected to the CAN bus 108 for providing audio information to a user. The audio module 114 includes a digital signal processor and chipset 116 interfacing with the CAN bus 108 and including a storage device 118 for storing instructions such as default run mode instructions and for storing audio files. As with the CAN module 106, the audio module 118 operates in a second or default mode in the event that the audio module 114 is not properly communicating via the CAN bus 108.

In one embodiment, the audio module 114 default operation mode stored in the storage device 118 may be a continuously repetitive duty cycle of 1-3 tones at a 60 sec off/2 sec on duty to alert a user that the audio module 114 is operating in a default mode. The tone set and duty timing may be selectable or preset in advance.

In addition, the audio module includes speakers 120 and a microphone input 122 to permit a user to record instructions or alerts.

In addition to or instead of the data that may be collected via the USB ports 212, 214, an optional external data module 134 may be connected to the CAN bus 108 for collecting data from the master controller 104 and/or for collecting data from any one or more of the other modules connected to the CAN bus including the audio module 114 and/or any or all of the CAN modules 106.

The date/time stamped collected data may include one or more of the following:
 1.) Cumulative run time per output
 2.) Cumulative counts of recipes ran
 3.) Programming/reprogramming/recipe edits tracking
 4.) Faults/errors (oven door open alarms, preheat faults, RH faults, . . . )
 5.) Boot/power ups & power down/turn Offs
 6.) All touch panel inputs (keystrokes; key logging)
 7.) Logic/software deduced data (power consumption, excessive heat/element duty to meet/hold temp set points, excessive water valve duty to meet/hold humidity set points, excessive oven door openings, excessive time oven door not closed, user selected time add ("+1" oven, "+5" proofer) flags incorrect recipe settings or other improper ops, etc.)

The data module 134 includes a communications module and CAN chipset 136 interfacing with the CAN bus 108 and including a storage device 138 for storing instructions such as default run mode instructions. As with the CAN module 106, the data module 138 operates in a second or default mode in the event that the data module 134 is not properly communicating via the CAN bus 108. The protocol instructions stored in storage device 138 may be one or more of the following protocols or any other wired or wireless protocol so that the module 134 is able to communicate with other devices: Zigbee, Bluetooth, Ethernet, WiFi, Cloud, Modular Bus, USB, RS232 and/or RS485. Those skilled in the art will recognize other protocols which may be stored in storage device 138.

The default operation mode of the data module 134 may be a continuously repetitive error code message transmittal indicating that the data module is operating in a default mode. The message may identify the module is operating without master control and/or CAN Bus function. The message format and timing with correlate with the applicable configuration (wireless, Zigbee, WiFi, . . . ).

Optionally, the data module 134 may have a network connection port 140 for interfacing with a network, and/or an antenna 142 for wireless connection to another device. The storage device 138 stores various protocols for communicating with other modules connected to the CAN bus and/or for communicating with other external or remote devices.

In one embodiment, the data module 134 and/or the data collected via the USB ports 212, 214 may include date/time stamped keystrokes entered by users in order to be able to monitor user activity and efficiency. In general, all collected data may be date/time stamped so that the status of each appliance can be correlated to the keystrokes of the user. For example, suppose a user incorrectly modifies a recipe or enters some other incorrect setting which causes food to be improperly cooked by a particular appliance. As a result, service could be requested because the particular appliance appears to be malfunctioning. Since keystrokes are stored, a service technician can review the user's keystrokes to determine the incorrect setting. If a data module 134 is configured to communicate with a remote device, the service technician can review the keystrokes remotely via the remote device and could avoid the need to make a service call. Thus, the data module 134 is configured to collect operation and/or use data which includes one or more of the following: user keystrokes, appliance run time, recipe counts, programming, reprogramming, recipe edits, faults, errors, power consumption, heat levels, set points, water valve operation, humidity set points, and door openings.

Optionally, a POS interface 144 may be connected to the CAN bus 108 for communicating with the data module.

It is also contemplated that one or more of the modules 106 may have wireless capability as noted herein with regard to the data module 134. It is also contemplated that one or more of the modules 106 may combined with the data module 134 as a single module.

As illustrated in FIG. 2, $3^{rd}$, $4^{th}$, . . . , Nth additional modules 106 may be added to the system 100 so that the system is expandable. In this regard, it is also contemplated that one or more additional audio modules 114 may be added to the system 100 to expand it and/or one or more data modules 134 may be added to the system to expand it. This expandability of the system allows flexibility in the system design and permits ease of modification of a system which has been installed and operating.

Figure 3:
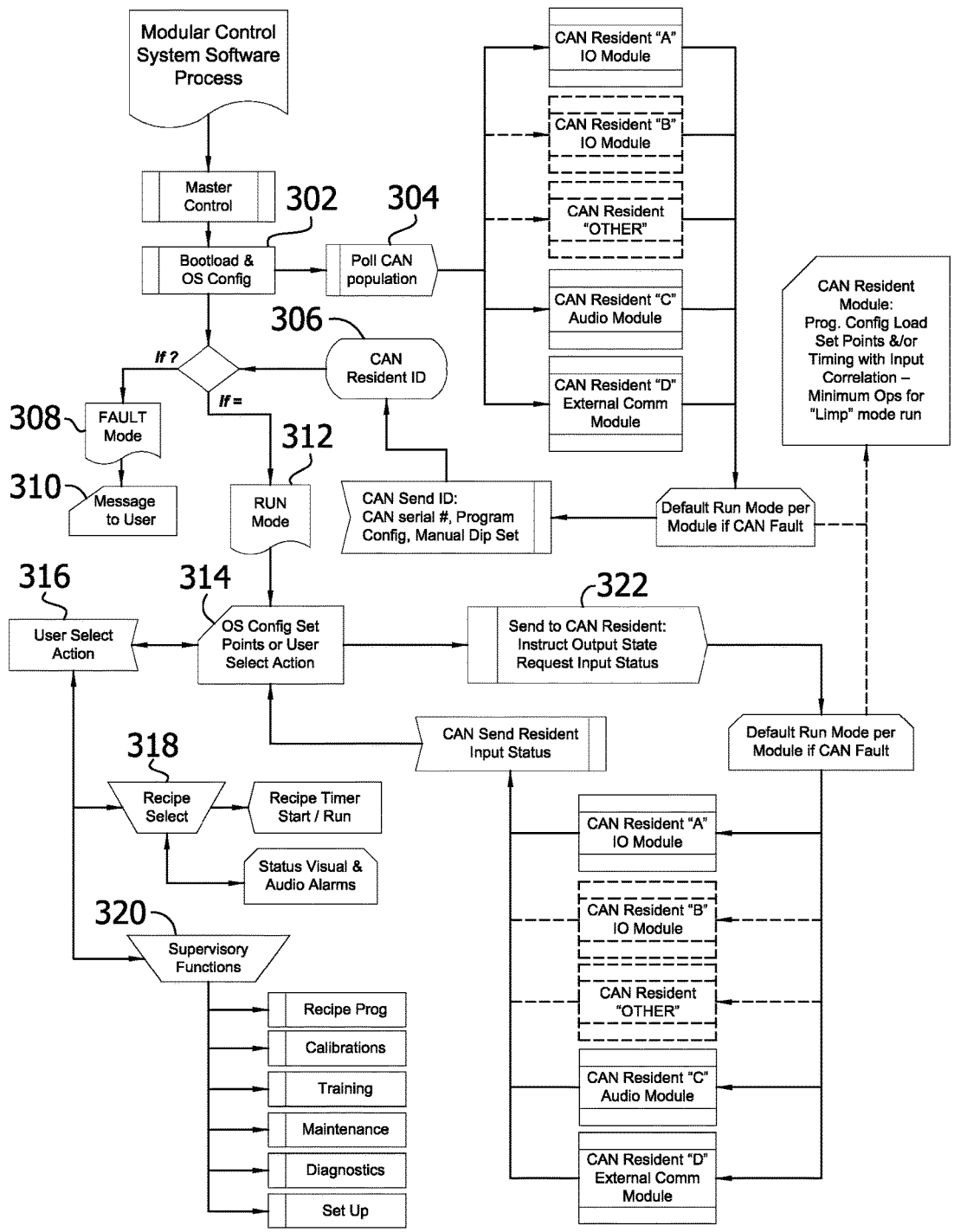
FIG. 3 is a flow chart of one embodiment of the operation of a system of the invention.

FIG. 3 is a flow chart of one embodiment of the operation of a system 100 of the invention. After booting and configuration at 302, the CAN modules are interrogated at 304 to obtain their IDs at 306. If a fault is detected at 308, the master controller 104 provides a message to the user at 310. Otherwise, the controller 104 executes the run mode instructions at 312. At 314, the master controller 104 instructs the CAN modules 106 to operate according to set points in memory and in response to user selected actions indicated by the user via the touch screen 208. At 316, various user selected actions are implemented including recipe selection at 318 and supervisory functions at 320 such as recipe programming, calibrations, training, maintenance, diagnostics and set up. At 322, the master controller 104 exchanges information with the CAN modules 106.

FIGS. 4A-4D are block diagrams of input/output (I/O) modules of one embodiment of the invention.

Figure 4A:
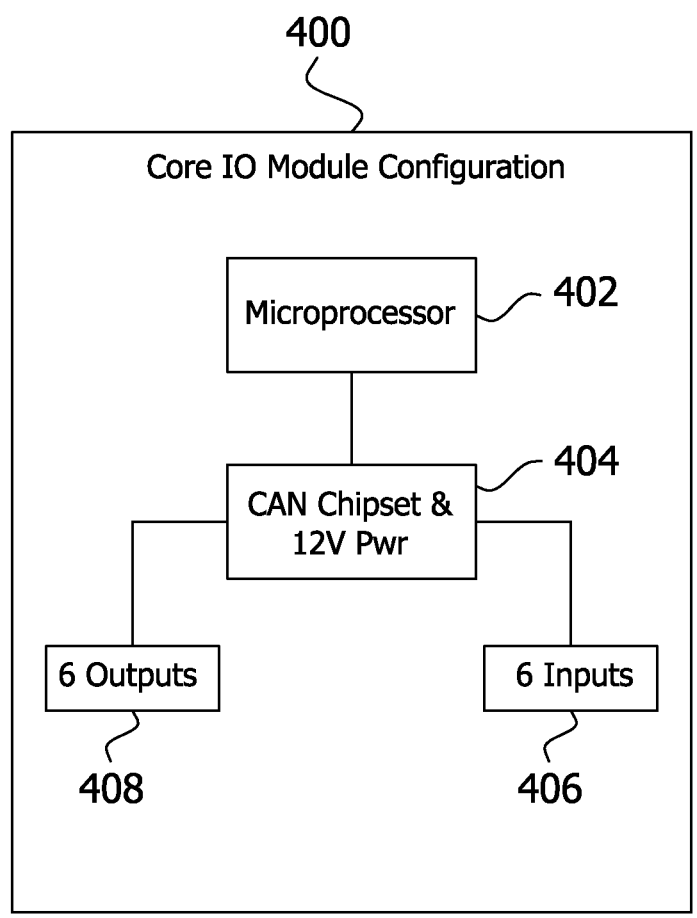
FIGS. 4A-4D are block diagrams of input/output (I/O) modules of one embodiment of the invention.

FIG. 4A illustrates the core I/O module configuration 400 including a microprocessor 402, a CAN chipset 404 for interfacing between the microprocessor and the CAN bus 108, six input conditioning circuits 406 and six output conditioning circuits 408.

Figure 4B:
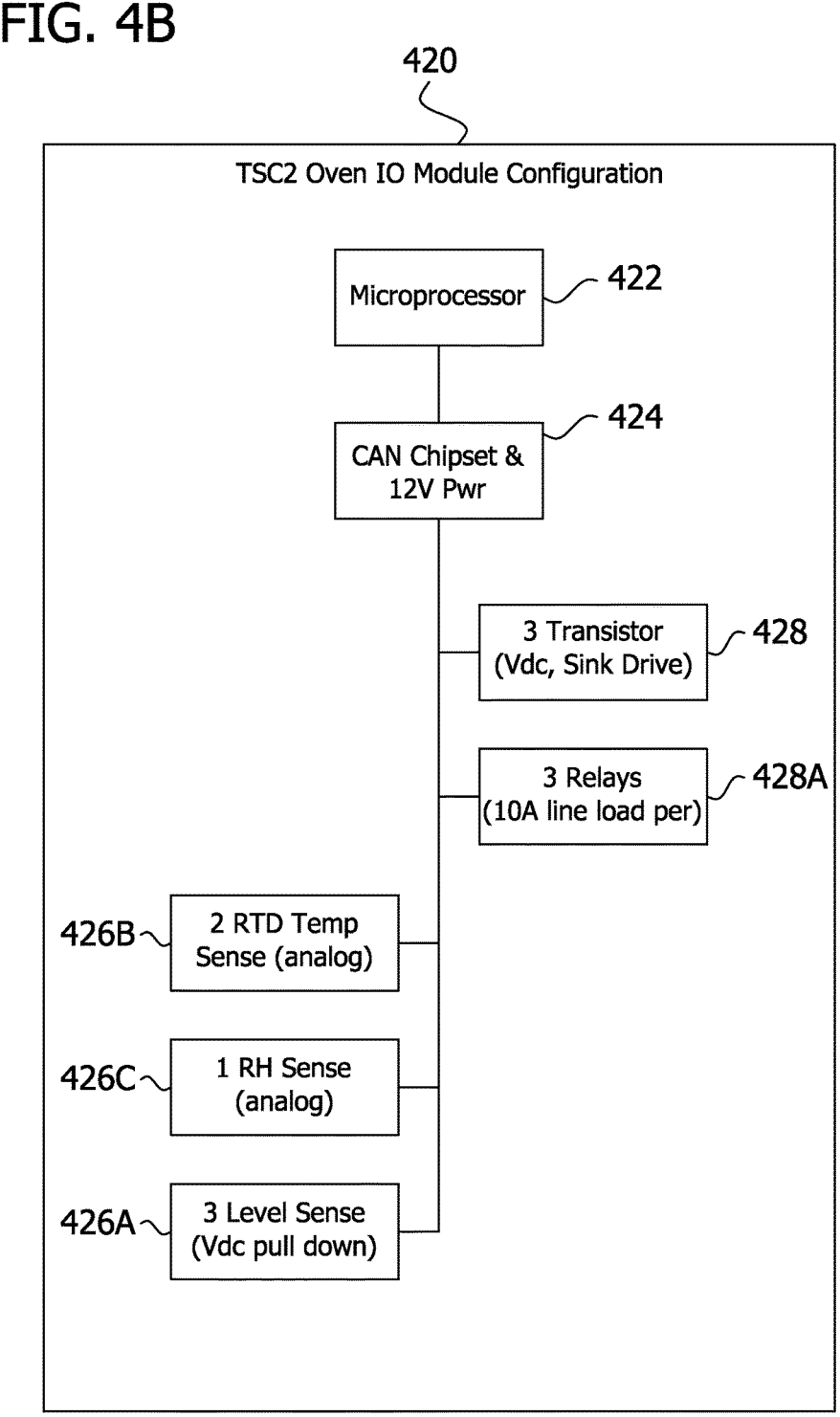

FIG. 4B illustrates the core I/O module configuration 420 including a microprocessor 422, a CAN chipset 424 for interfacing between the microprocessor and the CAN bus 108, six input conditioning circuits 426 and six output conditioning circuits 428.

Figure 4C:
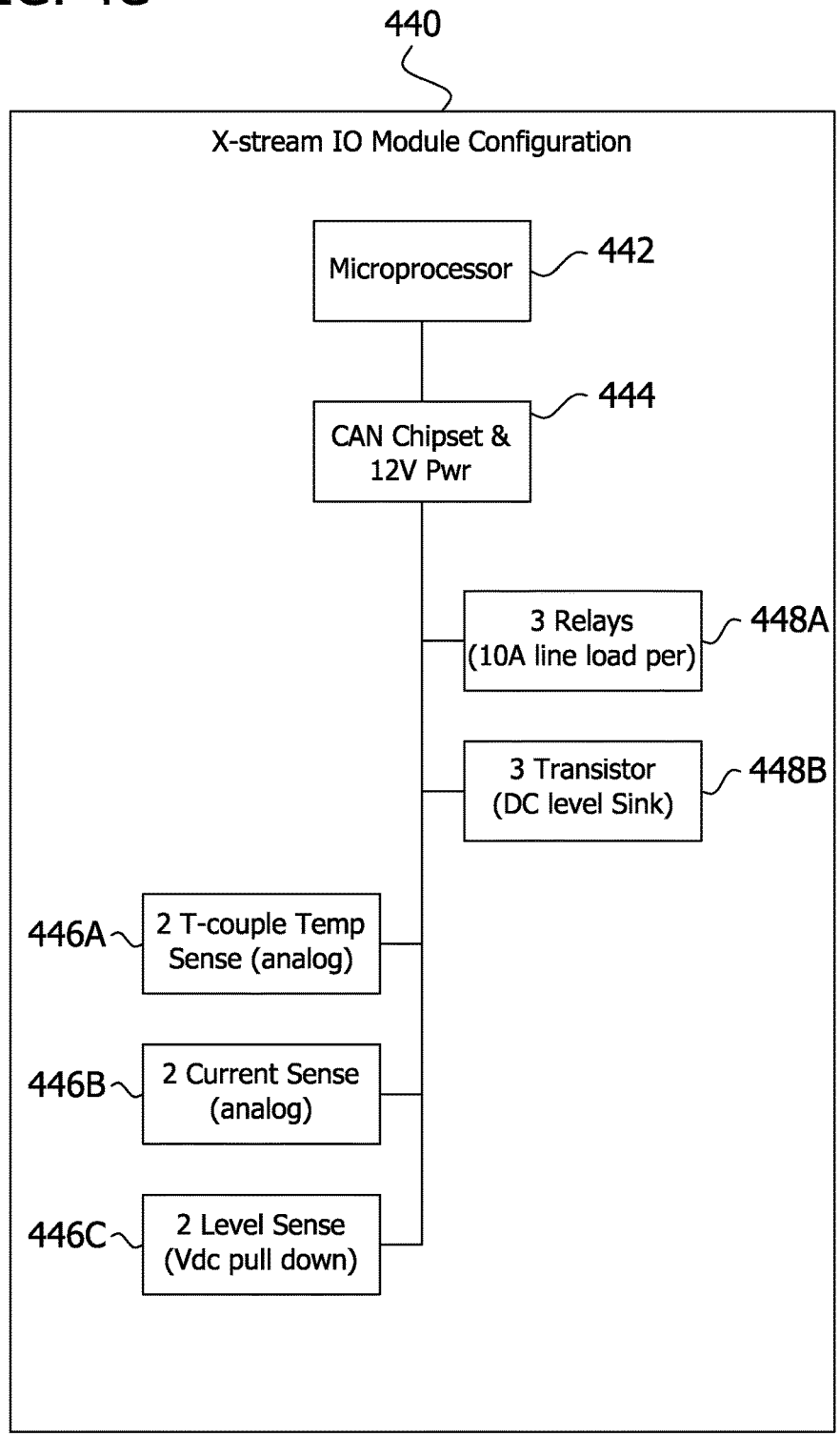

In the default run mode, the oven I/O module configuration 420 monitors the following inputs 426 and provides the following outputs 428:

3 Level Input (e.g., Oven Door Switch) 426A
2 analog input read (resistance temperature detectors—RTD Temps) 426B
1 analog input read (resistance humidity-RH) 426C
3 outputs controlled per analog input 428A
3 output controlled per Level Input 428B In the default run mode, the oven I/O module configuration 420 provides the following functions:

Controls Oven cavity at 350° F.
Controls Proofer cavity at 105° F.
Runs Oven Convection Blower if door closed
Disables Oven heat with door open
Runs Proofer RH Water inject 2 s On/60 s Off
Runs cavity lights 60 s On/2 s Off (heat beat)
Monitor CAN and disables the default mode if the CAN bus becomes active FIG. 4C illustrates another I/O module configuration 440 including a microprocessor 442, a CAN chipset 444 for interfacing between the microprocessor and the CAN bus 108, six input conditioning circuits 446 and six output conditioning circuits 448.

Figure 4D:
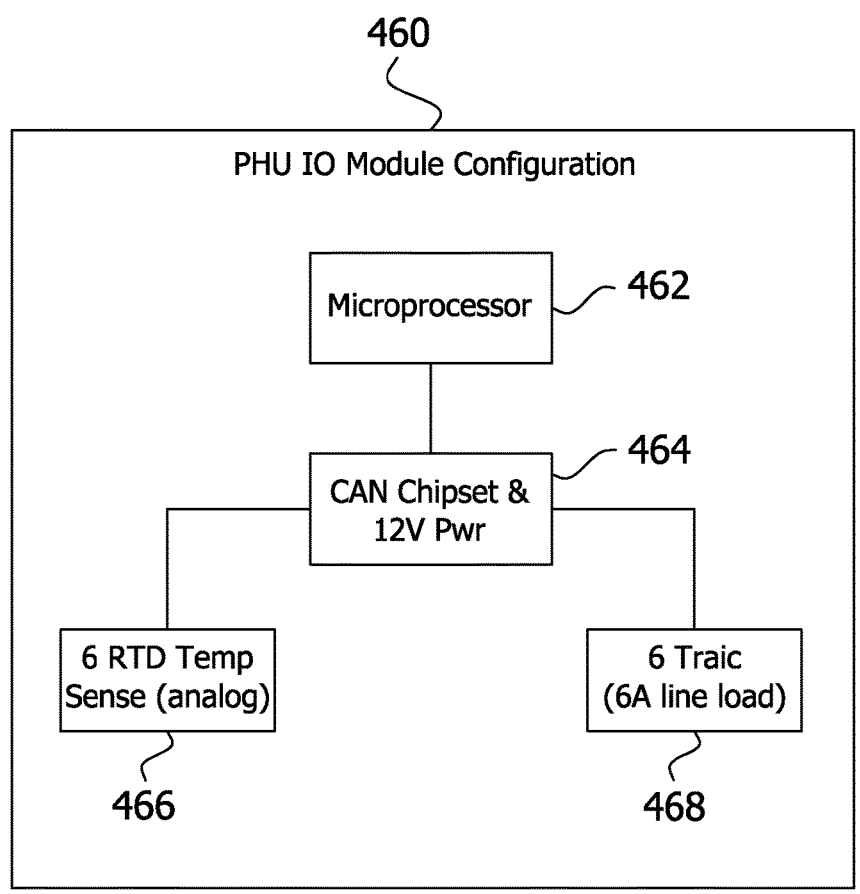

In the default run mode, the I/O module configuration 440 monitors the following inputs 446 and provides the following outputs 448:

2 analog input read (Thermocouple Temp) 446A
2 analog input read (Current Sense) 446B
2 Level Input (Float Switch) 446C
3 outputs controlled per level input 448A
3 outputs controlled per analog input 448B In the default run mode, the I/O module configuration 440 provides the following functions:

Enables sink heat if water full
Controls water temp
Enables circulating pump if water full
Runs pump at 60 s On/2 s Off duty FIG. 4D illustrates another I/O module configuration 460 including a microprocessor 462, a CAN chipset 464 for interfacing between the microprocessor and the CAN bus 108, six input conditioning circuits 466 and six output conditioning circuits 468.

In the default run mode, the I/O module configuration 460 monitors the following inputs 466 and provides the following outputs 468:

6 RTD temperature sense (analog) 466
6 Triac outputs controlled per analog input (e.g., 6A line load) switches 468

In the default run mode, the I/O module configuration 460 controls six (6) elements to a temperature set point (e.g., 150° F.)

In FIGS. 4A-4D above, as well as throughout the specification, the example illustrated is six (6) inputs and six (6) outputs and a 12 volt power supply. However, it is contemplated that the number of outputs may be more or less than six (6) and that the power supply may be other than 12 volts.

Screen Shots

Screen shots 1-4 illustrate the start screens of one embodiment of a master controller.

Proof Screen shots 1-7b illustrate the lower screens controlling the proofer of one embodiment of a master controller.

Oven Screen shots 1-6b illustrate the upper screens controlling the oven of one embodiment of a master controller.

Screen Shots

Appendix 1 includes four screen shots illustrating the start screens of a master controller. The screen shots show a display of a master controller of one embodiment of the invention.

Start screen 1 is a first boot/splash screen of the master controller displaying a manufacturer's logo and address, copyright information and software version information. After 5 seconds, the controller displays screen 2.

Start screen 2 is gray to indicate that the oven and the proofer have not been powered up. To power up the oven, a user touches an oven icon on the top left half of the screen. To power up the proofer, a user touches a proofer icon on the bottom left half of the screen.

Start screen 3 illustrates the screen when just the oven has been powered by the user touching the oven icon. At this point, the user can select a menu or is provided with a "ready" screen.

Start screen 4 illustrates the screen when both the oven and proofer have been selected and are preheating. The oven is indicated as preheating at 250 F. The proofer is indicated as having a temperature of 105 F and preheating for 3:00 minutes.

Appendix 2 includes four oven screen shots illustrating the screens controlling the oven of one embodiment of a master controller.

Oven Screen 1 shows the oven recipe timer is ready so that the timer may be started.

Oven Screens 2 and 3 show the oven recipe timer is ready so that the timer may be started, and includes an animated graphic in the upper left area of the screens indicating that the oven door is open.

Oven Screen 4 shows the oven recipe screen timer has completed counting down during a bake event so that the timer has expired as indicated by the timer display 0:00, at which point an audio beeper alarm may be activated.

Appendix 3 includes seven proofer screen shots illustrating the screens controlling the proofer of one embodiment of a master controller.

Proofer Screen 1 illustrates the proofer icon selected by the user. The oven portion of the screen has been grayed out. The user may select such options as time (e.g., 60 MINUTES), proofer number (e.g., PROOF 3), and cycle (e.g., DRY OUT).

Proofer Screen 2 shows the proofer has been activated and shows the proofer temperature (e.g., STARTING UP 70 F) as the proofer is preheating. The user may select such options recipe (e.g., BREAD, BREAD 2, COOKIES).

Proofer Screen 3 shows the proofer recipe screen when the proofer preheater is completed and the preheat temperature has been reached. At this point, the bar graph is reset and a 10 minute soak timer is started to stabilize the proofer. The master controller implements that soak timer on initial preheat after a boot cycle to stabilize the heat and humidity in the proofer. The timer indicates 1:00 minutes left in the soak cycle.

Proofer Screen 4 shows the proofer recipe screen after the 10 minute soak has been completed, so that the three sections of the proofer (upper, middle, lower) are ready and the user can start loading each section.

Proofer Screen 5 shows the proofer recipe screen with an upper timer for the upper (top) proofer section ready to start. The middle and lower section timers are running and timing. The middle section indicating 19:29 left in its cycle and the lower section indicating 39:34 left in its cycle.

Proofer Screen 6 shows the upper (top) proofer section timer expired (which may sound an audio beep alarm) with the upper time indicating 0:00. The middle section continues in its cycle with its timer indicating 19:57 and the lower section continues in its cycle with its timer indicating 40:02.

Proofer Screen 7 is displayed during running of the daily cleaning cycle or "DRY OUT" of the proofer. The controller automatically shuts down the proofer after the cycle is complete. Alternatively or in addition, the controller may be programmed to provide a "soft off" or "user interface disable" in which the proofer can be temporarily inactive.

In one embodiment, the invention includes a system for use with a first device a second device comprising:
 a master controller for controlling the operation of the first and second devices;
 a first CAN module having a plurality of outputs connected to the first device for controlling the operation of the first device;
 a second CAN module having a plurality of outputs connected to the second device for controlling the operation of the second device; and
 a CAN bus for interconnecting the master controller, the first CAN module and the second CAN module.

The master controller sends first CAN control signals to the first CAN module via the CAN bus to control the first device and the master controller sends second CAN control signals to the second CAN module via the CAN bus to control the second device. The first CAN module operates to control the first device in response to the first CAN control signals from the master controller and the second CAN module operates to control the second device in response to the second CAN control signals from the master controller.

In one embodiment, the master controller includes software operating instructions for each of the devices and the devices themselves do not include any significant operating instructions.

In one embodiment, the controller includes substantially all intelligent software for the appliances linked to it via the CAN bus. The other boards of the system are dumb, single-function devices so that products can be customized to fit the needs of the end user and components are reusable in multiple product builds.

As noted herein, it is contemplated that commercial appliances for handling food includes commercial appliances for cooking (e.g., proofer, oven) and/or cooling (refrigerator, freezer) and/or holding (display, merchandizer or food storage.

It is also contemplated that aspects and/or embodiments of systems and methods of the invention may be applicable to higher level systems that monitor and/or control devices. Thus, it is contemplated that the commercial appliance 102 may be one or more of the following: a smart kitchen, a remote maintenance system, a remote firmware update system, an e-maintenance system, an e-training system (e.g., providing maintenance and training on an LCD panel), and/or an automated kitchen. For example, the common connectivity between appliances provided by the systems and methods of the invention automates and combines the tasks of multiple appliances eliminating some manual steps and/or user errors.

As another example in the area of home automation, a CAN communication module interfaces a home automation controller, or interface with a user directly via a smart device such as smart phone to offer various features. Such features may include monitoring and/or remotely controlling a home oven. For instance, user could confirm that their oven is off from their cell phone, or they could preheat their oven while driving home, or they could plan ahead with food in the oven ready to cook on the way home, or they could configure a system to play music as an indicator that the food is cooked, or they could send messages to a home automation sound system to play music when the food is cooked. In addition, such a system could incorporate a LCD front end that high end consumers use for complex and advanced controls and/or monitoring.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the invention may include different processor-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

APPENDIX 1—START SCREENS
Start Screen 1:
Boot / Splash Screen
Start Screen 2:
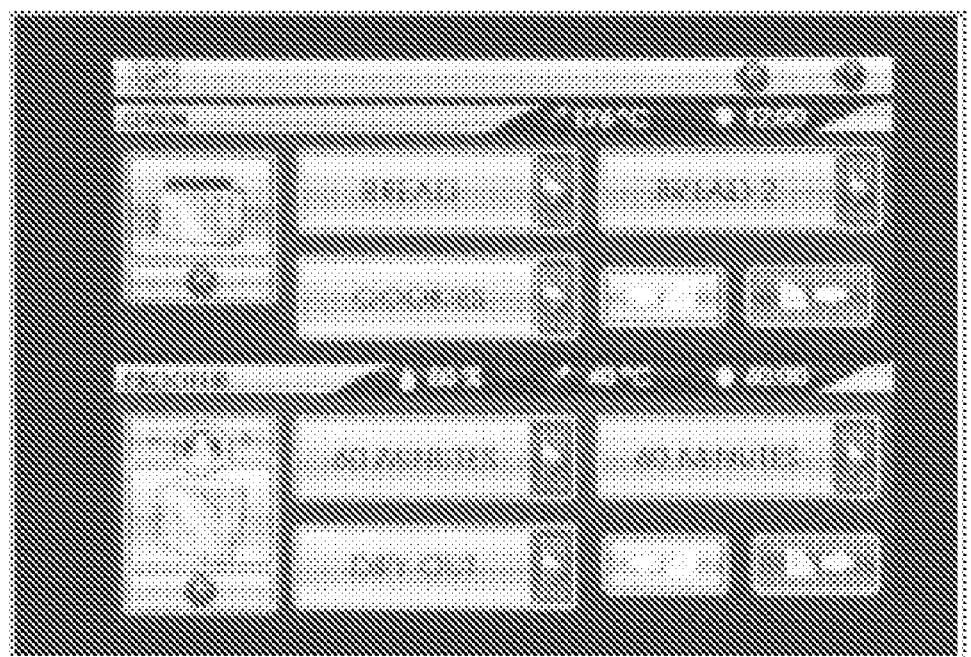
Auto Change to "GRAY" / OFF screen Start Screen 3:
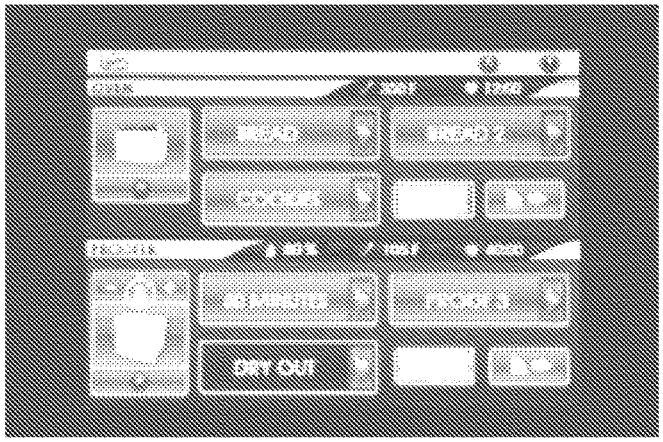
User Touch of Oven ICON goes to "BLUE" / Menu Select / Ready screen
Start Screen 4:
Oven & Proofer Recipe Selected & Preheating APPENDIX 2—OVEN SCREENS
Oven Screen 1:
Oven Recipe Timer Ready to START Timer
Oven Screen 2:
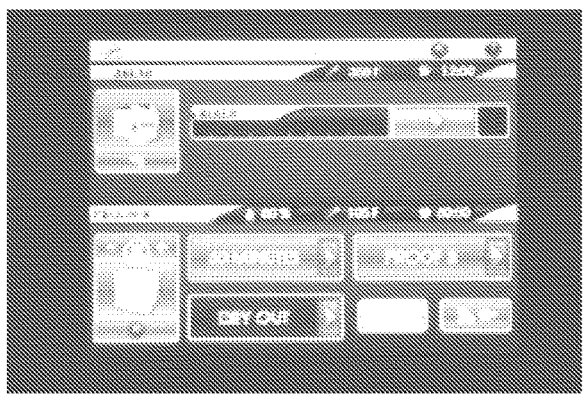
Oven Recipe Timer Ready to START Timer & animation showing Oven Door Open
Oven Screen 3:
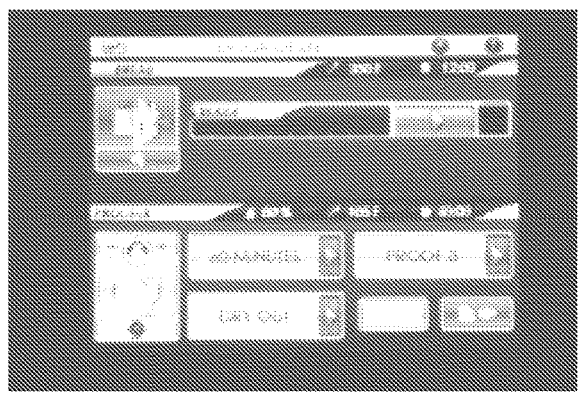

Oven Screen 4:
Oven Recipe Timer Expired w/ audio beeper alarm

APPENDIX 3—PROOFER SCREENS
Proofer Screen 1:
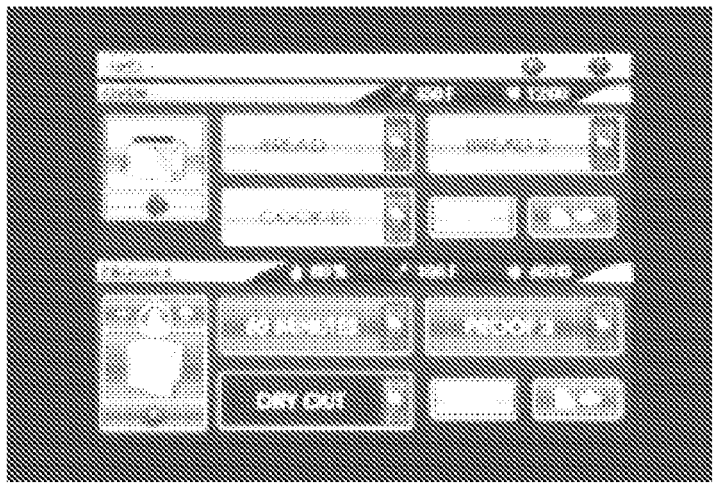
Proofer ICON
User Select
Proofer Screen 2:
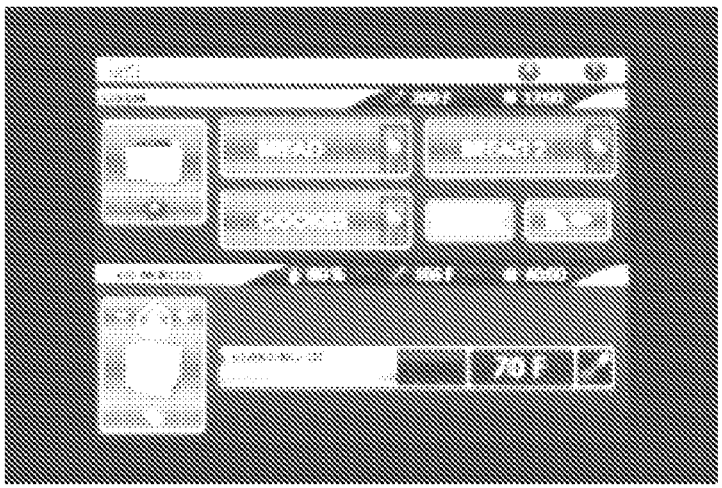
Proofer Temperature Preheating Proofer Screen 3:
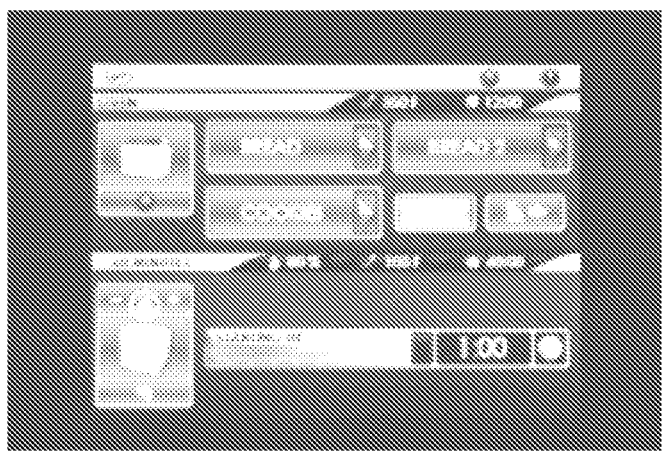
Proofer "SOAK" / stabilize 10 min. after Temp. Preheating
Proofer Screen 4:
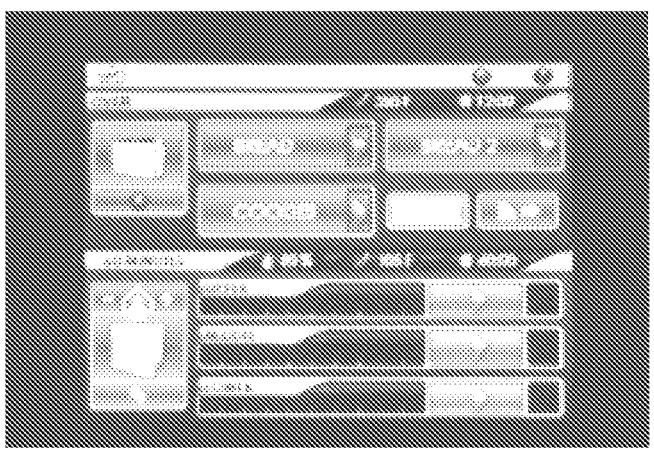
Proofer 1/3rd Section Timers Ready to Start Proofer Screen 5
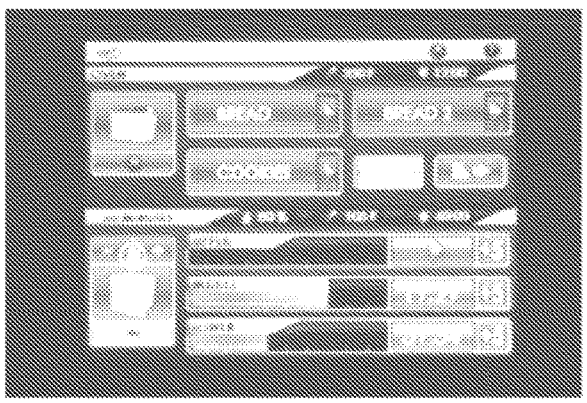
Top Proofer section ready to start
Middle & Bottom Proofer section Timers running
Proofer Screen 6:
Top Proofer section Timer expire w/ audio beep alarm
Middle & Bottom Proofer section Timers running
Proofer Screen 7:
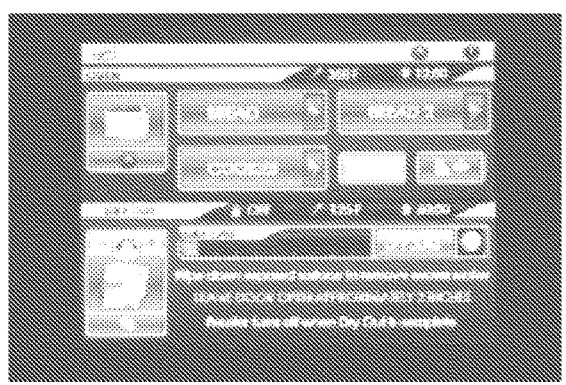
Daily Cleaning "DRY OUT" Proofer cycle running.
Auto unit / global soft shut down after Dry Out completed

APPENDIX 4—AN EMBODIMENT OF ONE IMPLEMENTATION

CAN Bus appliance system: Master Control, 2 or more I/O modules:

Master module reads CAN I/O module id and config and uniquely communicates with it.

Each of the I/O modules, advanced feature modules, and the Master Control uses a common isolated CAN bus IC.

An Analog Devices ADM3053 isolates the CAN bus and converts on each module a mfr. imbedded unique serial number that allows each module to identify itself & communicate its firmware configuration at system boot. The Master module can read what firmware config is part of the unit at boot & uniquely communicate with each.

The Master module include a 5.7 LCD display & touch panel for user interface.

The Master module has a memory device such as an 8 Gb (*or any other memory size*) on board NAND Flash memory, an internal additional solid state hard drive connection (USB Memory stick), & external USB connections for write / write functions initially limited to USB Memory stick. The large memory capacity allows user selectable language via complete OS reload (English, French, German, Spanish, Russian, Czechoslovakian, Polish, Chinese, etc.).

Data storage options – 2 USB ports arranged to accept one external USB thumb drive for occasional firmware/language/feature updates, plus one internal USB thumb drive intended to store recorded data (diagnostics, etc.) which could then be transferred to Duke (manufacturer) for analysis if the system is not connected to a larger communication system.

User OS language select per appliance: Memory store & allow user selection to convert from up to 7 language library (7 languages initially) with global auto translation / conversion of all user viewed displayed screens.

The CAN bus architecture allows direct integration of a lower featured Master Control (simplified user interface) on up to direct PC / laptop / network Master Control. Readily available / off the shelve / reasonably priced CAN bus converters or Duke Mfg. proprietary advanced feature modules may be required for PC / network integration along with PC loadable apps type software.

Modular system is not unit / appliance limited. The CAN & 12Vdc power architecture can be interconnected in a single appliance enclosure or interconnected between multiple appliances using a single appliance Master Control (master / slave)

Store-wide system integration of non-Duke appliances &/or Duke multi-function systems (front counter, I-line, temperature controlled "salad bar" type assemblies) via installation of wired/wireless modules operating in a node network (e.g., Zigbee-based system). Adaptation of a separate module to collect data (temperatures, run time, door switch faults, etc.) as part of the larger Duke system is contemplated.

User replaceable low voltage low current controller—Master Control/display is low-voltage and housed in sheet metal for potential access by a store-level person ("skilled personnel" or "other than Duke Service personnel"), avoiding an expensive service call. Area behind the control panel will have guarding to avoid user-access to high-voltage components.

Limp mode for module:
Flash appliance light in limp mode; Open &/or closed loop temp, humidity, & safe function (oven door interlock of heat & convection blower).

The I/O board's memory allows for basic / default / limp mode operation should CAN communications fail or if a Master Control fails. In a TSC app, the default I/O module runs & holds the oven at approximately a 350°F set point, runs the proofer at 105°F 80%RH, & cycle the oven & proofer cavity light 60s ON / 2s OFF for a user indicator of default run mode enabled. The I/O module automatically switches to default run mode if the CAN bus is inactive for approximately 30sec. after a power up boot cycle or if the CAN drops out for greater than approximately 30sec during normal run modes with auto deactivation should CAN bus come back on-line.

Default run mode of I/O Modules if CAN / Master bus is faulted. Integrated I/O Module programming operates in "Limp" mode of input read & output drive w/o CAN or with Master Control failure.

3 tier ID:
The I/O modules also have a 4-pack dip switch to manually 'set' additional identification up to 16 of common configuration I/O modules to the CAN bus. The dip switch setting basically allows the Master Control to see & uniquely communicate with any single I/O module even if there are 16 of the same hardware / software / firmware I/O boards connected to the CAN bus. Each I/O module also has redundant or pass through CAN bus & 12V unregulated power header connections allowing daisy chain interconnect to other or the next I/O module PCB.

Multiple common firmware (hardware & software) I/O Modules can be uniquely addressed & have different functionality in an application.

I/O Module PCB have 3-teir ID: CAN interface IC with hard coded unique serial #, software ID of function prog config, & manual DIP switch settings per I/O Module PCB to define multiple use of common firmware I/O Modules. 1-16 commonly constructed & programmed I/O Modules can be used in a single appliance with unique functionality per I/O Module.

Advanced Communication Data module:
Time and date stamp data; Internal/external USB flash drive.

Advanced communication module enables any/all data passing through the processor to be recorded and transmitted either locally or remotely. It is remote diagnostics where each appliance reports its use metrics/diagnostics/prognostics/etc. to a Duke service dept. server where the data is analyzed and decisions or recommendations are made and communicated back to the parent company or local store operator. Real-time clock is built in to allow date/time stamping of various recorded data. Optional remote-interrogation of each appliance from a Duke site (similar to Microsoft remote assistance for PC's) is contemplated.

Audio module:
Advanced audio functions include music, tone combinations, and/or user-voice commands recorded into the controller and assigned to various functions or alarm states. Possible stereo sound with 2 speakers mounted within the appliance.

User loadable & programmable audio files for alarms & instructions. The Advanced Audio Module is Wave file compatible with DSP (Digital Sound Processing) allowing music complex alarm sounds up to verbal instruction per event based alarm.

Power supply module:
There is a linear 12Vdc power supply module PCB. The power supply module is a linear 12Vdc 36VA capacity supply that can supply up to 10 module PCB's with interconnect / reference provision for adding or stacking more capacity in 36VA increments.

Daisy Chain:
Per Module PCB connection to active bus (CAN) with daisy chain interconnection for jumper add Modules additions. Each Module PCB has 2 paralleled 5-pos headers for 12Vdc power & CAN allowing Module PCB to Module PCB point to point jumper to add a Module.

I/O Module:
3 RTD inputs; 1 RTD input configurable (stuff option) for an RTD, or for approximately 0-4V (=0-100%RH) humidity probe, or a current sensor input (Speed Oven / RCO carry), or thermocouple temperature level input.

Component usage should carry over from today's TSC control unless needed. Supply chains & alternates are well covered & we have field use history support. Integrating the 3.3 & 5V supplied on each module for noise / filtering & burdening the separate front-end power supply module with load capacity guessing. Higher power rectifier / filters are low cost, covering 5V regulator power for 1,2 3, ..6 I/O modules are, so off I/O module board 5V regulators may be more costly. The main 12V unregulated supply board can supply 3.3/5V to the main control; it's always a known load.

In/out parallel headers on the CAN bus & the 12V unregulated supply may be used. Or, each line is spliced or double crimped at each module board & every model usage could be a fully unique Lo V wire harnessing. Dual header allows use of common jumper wire assemblies for board to board connects of any number of modules. Boards mounting on the rear divider wall of the TSC control section, limited in height to 4.5".

I/O Module:
3 RTD temp inputs, 1 RH sense input, 3 Vdc level sense inputs, 3 line level load control relays, & 3 low level Vdc sink drives.

The I/O modules need only have limited intelligence & memory; sufficient for "slave" functions as communicated by the Master module for load control direction & sensed data communications, & for limp or default mode functions. The initial I/O module configuration is 3 RTD temp inputs, 1 RH sense input, 3 Vdc level sense inputs, 3 line level load control relays, & 3 low level Vdc sink drives. Other I/O module configurations will have variations in input / output types (current sense, thermocouple, on board traic load drives, etc.), but other configuration variations should maintain common micro, memory, & CAN bus firmware.

What is claimed is:

1. A food treatment appliance for treating food, the food treatment appliance comprising:
  a housing having at least one food treatment space for holding food to be treated,
  a food treatment subsystem associated with the at least one food treatment space, the food treatment subsystem including at least one food treatment device for treating food in the at least one food treatment space,
  a master controller for controlling operation of the food treatment subsystem to control a food treatment environment in the at least one food treatment space, the master controller including a user interface and a food treatment processor, the user interface including a user input device,
  a CAN module having a plurality of ports operatively connected to the food treatment subsystem for controlling and monitoring operation of the food treatment subsystem, at least one of said ports being operatively connected to the at least one food treatment device, the CAN module having a master controlled mode of operation responsive to the master controller for controlling the food treatment subsystem to control the food treatment environment in the at least one food treatment space, and the CAN module having a fault mode of operation independent from the master controller for controlling the food treatment subsystem to control the food treatment environment in the at least one food treatment space,
  a CAN bus operatively connecting the master controller and the CAN module,
  said master controller sending first control signals to the CAN module via the CAN bus to control the food treatment subsystem,
  said CAN module operating in its master controlled mode to control the food treatment subsystem in response to the first control signals from the master controller when the master controller is in communication with the CAN module via the CAN bus, and
  said CAN module operating in its fault mode to control the food treatment subsystem according to default preset food treatment operational parameters when the master controller is not in communication with the CAN module via the CAN bus.

2. A food treatment appliance as set forth in claim 1 wherein when the CAN module operates in its fault mode, the CAN module operates independent of instructions from outside the CAN module.

3. A food treatment appliance as set forth in claim 1 wherein when the CAN module operates in its fault mode, the CAN module operates independent of user input from the user input device.

4. A food treatment appliance as set forth in claim 1 wherein the CAN module operates in its fault mode to control the food treatment subsystem according to the default preset food treatment operational parameters until communication with the master controller resumes via the CAN bus.

5. A food treatment appliance as set forth in claim 1 wherein the master controller provides a recipe option select and execute function responsive to user input via the user input device for controlling the food treatment subsystem via the CAN module in its master controlled mode, and the CAN module lacks a recipe option select and execute function during operation in said fault mode.

6. A food treatment appliance as set forth in claim 1 wherein the CAN module controls the food treatment subsystem to signal to the user that the CAN module is operating in the fault mode.

7. A food treatment appliance as set forth in claim 6 wherein the master controller user interface includes a display, and the CAN module signals operation of the fault mode to the user other than via the display.

8. A food treatment appliance as set forth in claim 6 wherein the CAN module controls the food treatment subsystem to signal operation of the fault mode to the user by activating an audible or visual signal.

9. A food treatment appliance as set forth in claim 1 wherein the default preset operational food treatment parameters include at least one of a temperature parameter or a moisture delivery parameter.

10. A food treatment appliance as set forth in claim 1 wherein the at least one food treatment device comprises a first food treatment device and a second food treatment device, the CAN module in the fault mode controlling the first food treatment device according to first default preset food treatment operational parameters and controlling the second food treatment device according to second default preset food treatment operational parameters different than said first default preset food treatment operational parameters.

11. A food treatment appliance as set forth in claim 1 wherein the at least one food treatment device comprises at least one of a heating system, a humidifier, or a convection fan.

12. A food treatment appliance as set forth in claim 1 wherein the CAN module is a first CAN module, the food treatment subsystem is a first food treatment subsystem, and the food treatment appliance further comprises a second CAN module and a second food treatment subsystem, the second CAN module having a plurality of ports operatively connected to the second food treatment subsystem for controlling and monitoring operation of the second food treatment subsystem, the second CAN module having a master controlled mode of operation responsive to the master controller for controlling the second food treatment subsystem and having a fault mode of operation independent from the master controller for controlling the second food treatment subsystem, the CAN bus operatively connecting the master controller and the second CAN module, said master controller sending second control signals to the second CAN module via the CAN bus to control the second food treatment subsystem, said second CAN module operating in its master controlled mode to control the second food treatment subsystem in response to the second control signals from the master controller when the master controller is in communication with the CAN module via the CAN bus, said second CAN module operating in its fault mode to control the second food treatment subsystem according to default preset food treatment operational parameters when the master controller is not in communication with the second CAN module via the CAN bus.

13. A food treatment appliance as set forth in claim 12 wherein the default preset food treatment operational parameters for the first CAN module are different than the preset food treatment operational parameters for the second CAN module.

14. A food treatment appliance as set forth in claim 12 wherein the second food treatment subsystem includes a food treatment device having a different food treatment function than the food treatment device of the first food treatment subsystem.

15. A food treatment appliance as set forth in claim 12 wherein the at least one food treatment space is a first food treatment space and the food treatment appliance further includes a second food treatment space, the second food treatment subsystem being associated with the second food treatment space for treating food in the second food treatment space.

16. A food treatment appliance as set forth in claim 12 wherein the first and second CAN modules operate independent of each other when the first CAN module operates in its fault mode and the second CAN module operates in its fault mode.

17. A food treatment appliance as set forth in claim 1 wherein the master controller is responsive to user input via the user input device for adjusting parameters for controlling the food treatment subsystem, and the master controller further comprises a storage device storing instructions executed by the food treatment processor including instructions for controlling operation of the master controller and instructions for controlling the food treatment subsystem.

18. A food treatment appliance as set forth in claim 17 wherein the storage device of the master controller stores instructions for identifying the CAN module and a configuration of its associated food treatment subsystem, wherein the storage device of the master controller stores a plurality of instructions for controlling various configurations of food treatment subsystems, and the processor executes one of the plurality of instructions for controlling the food treatment subsystem based on the identity of the CAN module and based on the configuration of the food treatment subsystem.

19. A food treatment appliance as set forth in claim 18 wherein the CAN module includes a unique serial number communicated to the master controller, the CAN module has a firmware configuration corresponding to the food treatment subsystem associated with the CAN module, and the CAN module communicates to the master controller its unique serial number and its associated food treatment subsystem configuration.

20. A food treatment appliance as set forth in claim 1 wherein the CAN module has a plurality of input ports for monitoring the status of the food treatment subsystem.

21. A food treatment appliance as set forth in claim 1 wherein the appliance is configured for heating the food to preserve the food or to cook the food.

22. A food treatment appliance as set forth in claim 1 wherein the at least one food treatment device comprises a heating system.

23. A food treatment appliance for treating food, the food treatment appliance comprising:
a housing having at least one food treatment space for holding food to be treated,
a food treatment subsystem associated with the at least one food treatment space, the food treatment subsystem including at least one food treatment device for treating food in the at least one food treatment space,
a master controller for controlling operation of the food treatment subsystem to control a food treatment environment in the at least one food treatment space, the master controller including a user interface and a food treatment processor, the user interface including a user input device,
a CAN module having a plurality of ports operatively connected to the food treatment subsystem for controlling and monitoring operation of the food treatment subsystem, at least one of said ports being operatively connected to the at least one food treatment device, the CAN module having a master controlled mode of operation responsive to the master controller for controlling the food treatment subsystem and having a fault mode of operation independent from the master controller for controlling the food treatment subsystem,
a CAN bus operatively connecting the master controller and the CAN module,
said master controller sending first control signals to the CAN module via the CAN bus to control the food treatment subsystem,
said CAN module operating in its master controlled mode to control the food treatment subsystem in response to the first control signals from the master controller when the master controller is in communication with the CAN module via the CAN bus, and
said CAN module operating in its fault mode to control the food treatment subsystem according to default preset food treatment operational parameters when the master controller is not in communication with the CAN module via the CAN bus;
wherein the at least one food treatment device comprises at least one of a heating system, a humidifier, or a convection fan.

24. A food treatment appliance as set forth in claim 23 wherein the at least one food treatment device comprises the heating system.

* * * * *